March 26, 1935.  G. B. LAURA  1,995,429

MACHINE FOR THE MANUFACTURE OF SHOES WITH RUBBER SOLES

Filed Aug. 23, 1932   8 Sheets-Sheet 1

INVENTOR
GIOVANNI BATTISTA LAURA, DECEASED.
BY MARIO LAURA, HEIR AT LAW.

BY Haseltine, Lake & Co.
ATTORNEYS

March 26, 1935.  G. B. LAURA  1,995,429
MACHINE FOR THE MANUFACTURE OF SHOES WITH RUBBER SOLES
Filed Aug. 23, 1932   8 Sheets-Sheet 3

INVENTOR.
GIOVANNI BATTISTA LAURA, DEC'D.
BY MARIO LAURA, HEIR AT LAW.

BY Haseltine, Lake & Co.
ATTORNEYS

INVENTOR.
GIOVANNI BATTISTA LAURA, DECEASED.
BY MARIO LAURA, HEIR AT LAW.
BY Haseltine Lake & Co.
ATTORNEYS INVENTOR.
GIOVANNI BATTISTA LAURA, DECEASED.
BY MARIO LAURA, HEIR AT LAW.
BY Haseltine, Lake & Co.
ATTORNEYS March 26, 1935.   G. B. LAURA   1,995,429
MACHINE FOR THE MANUFACTURE OF SHOES WITH RUBBER SOLES
Filed Aug. 23, 1932   8 Sheets-Sheet 7

INVENTOR.
GIOVANNI BATTISTA LAURA, DECEASED.
BY MARIO LAURA, HEIR AT LAW.
BY Haseltine, Lake & Co.
ATTORNEYS Patented Mar. 26, 1935

UNITED STATES PATENT OFFICE 1,995,429

MACHINE FOR THE MANUFACTURE OF SHOES WITH RUBBER SOLES

Giovanni Battista Laura, deceased, late of Saronno, Italy, by Mario Laura, heir at law, Saronno, Italy Application August 23, 1932, Serial No. 630,112
In Italy January 8, 1932

14 Claims. (Cl. 12—7)

The present invention refers to a machine for the manufacture of shoes with rubber soles of the kind in which the sole is directly vulcanized on to the upper.

The principal object of the invention is to obtain the greatest simplification as compared with known machines and systems of manufacture of shoes with rubber soles, in such manner as to reduce their cost to a minimum, the system and the machine according to the invention not necessitating the use of supplementary apparatus, separate lasts, presses, moulds for soles, boilers, carriages, hot air furnaces and the like as is the case with other known systems and machines.

In the use of such a machine, the upper is delivered directly by the sewing machine department, the raw rubber is supplied by the mixers, and the said machine produces in the most rapid and exact manner the shoe by means of the work of a single operator, thus making the control of the production easy.

Another important object of the invention is to obtain greater strength and durability as also greater elegance of the shoes than it has been possible to produce hitherto with the use of known machines of the same character, or of different character, as for example, those where the sole is sewn or stuck on to the upper.

The defects due to the shoes made according to the latter systems, are known; they may be recapitulated in that the sole is easily detached from the upper after too short a period.

On the other hand, the difficulties to be surmounted in order to realize a process for the manufacture of shoes with the sole vulcanized directly on the upper, are very great seeing that in order to vulcanize a sole, a temperature of about 150° centigrade, and a pressure of at least 10 kg. per square cm. is necessary if it is desired for the rubber to adhere perfectly with the fabric of the upper. One of the greatest difficulties has been due to the fact that the rubber at the temperature and pressure above mentioned is very plastic and almost fluid, so that it easily escapes through the cracks of the lasts or moulds used in the machines or apparatus used in the manufacture.

The numerous trials made in this field, as can be confirmed in the known systems and machines of this nature, have hitherto not led to any good results, precisely in view of the fact that the above-mentioned difficulties have not been entirely surmounted, which explains why the said known systems and machines have not hitherto been applied to any considerable extent industrially.

The system and the machine according to the invention overcome the inconveniences and difficulties above mentioned by the provision of measures and means adapted to prevent the rubber heated and under pressure filtering or escaping in any manner through the edges of a mould and the fabric.

These means and measures are preferably carried out by pressure devices acting directly against the irregular edges of a mould, and this in such manner that the fabric of the upper mounted on the said last, cannot be cut or weakened at the points of pressure seeing that the upper is pressed by the pressure devices not against the metal of the last but against a lining of elastic material contained in a groove of the last.

The pressure members are preferably provided in such manner as to be constituted by segments carrying at their upper part jaws having their inner profile corresponding exactly to the profile of the last, and rotating approximately 90° about axes on which they pivot.

The machine comprising the devices and the mechanisms necessary for a complete manufacture of the shoe will now be described with reference to the annexed drawings which are given as an example.

Figure 1:
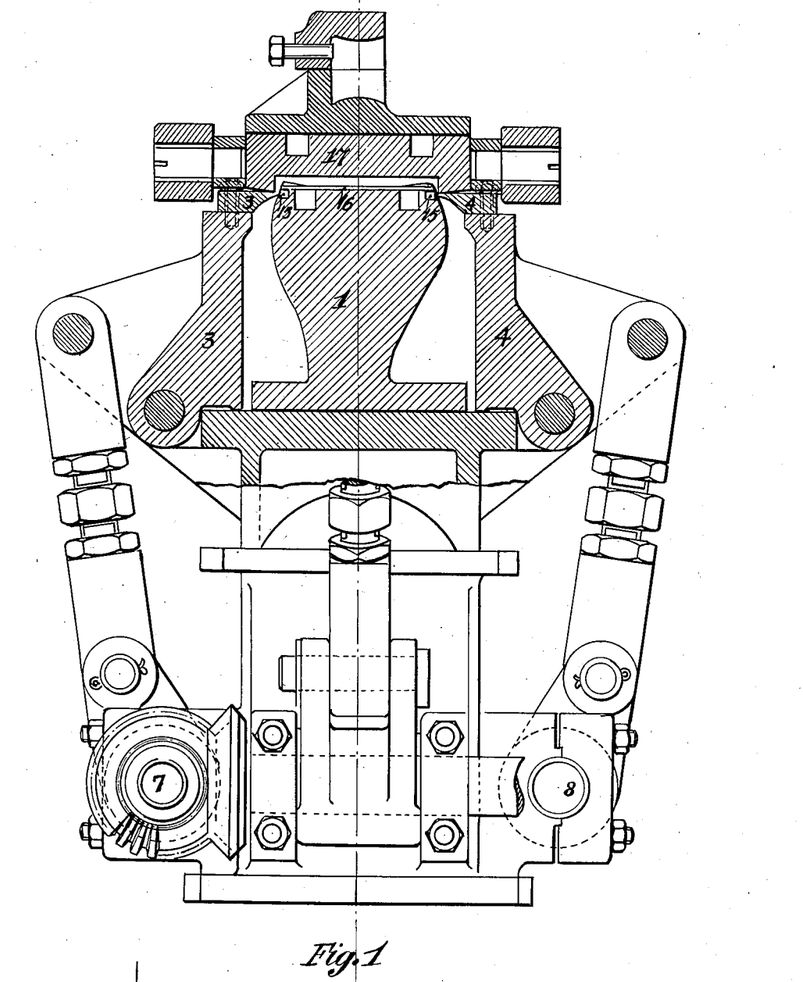
Figure 1 which is a front elevation of the machine, partially in section, shows in vertical section the construction of one of the two lasts of which the apparatus is composed, and which is fixed on a platform, as also the coupling means between the shafts and the segments pivoting on the platform.
Figure 1A:
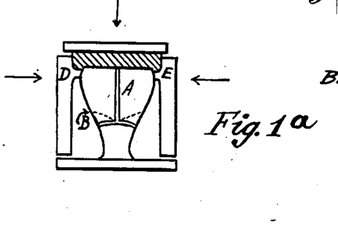
Figure 1a is a diagrammatic detail of the last with the upper mounted thereon, and the movable mould, for the sole, according to known apparatus, showing how the lateral edges must be pressed against this last to prevent the heated rubber under pressure filtering through between the said edges and the fabric.
Figures 2, 3, 4, 5:
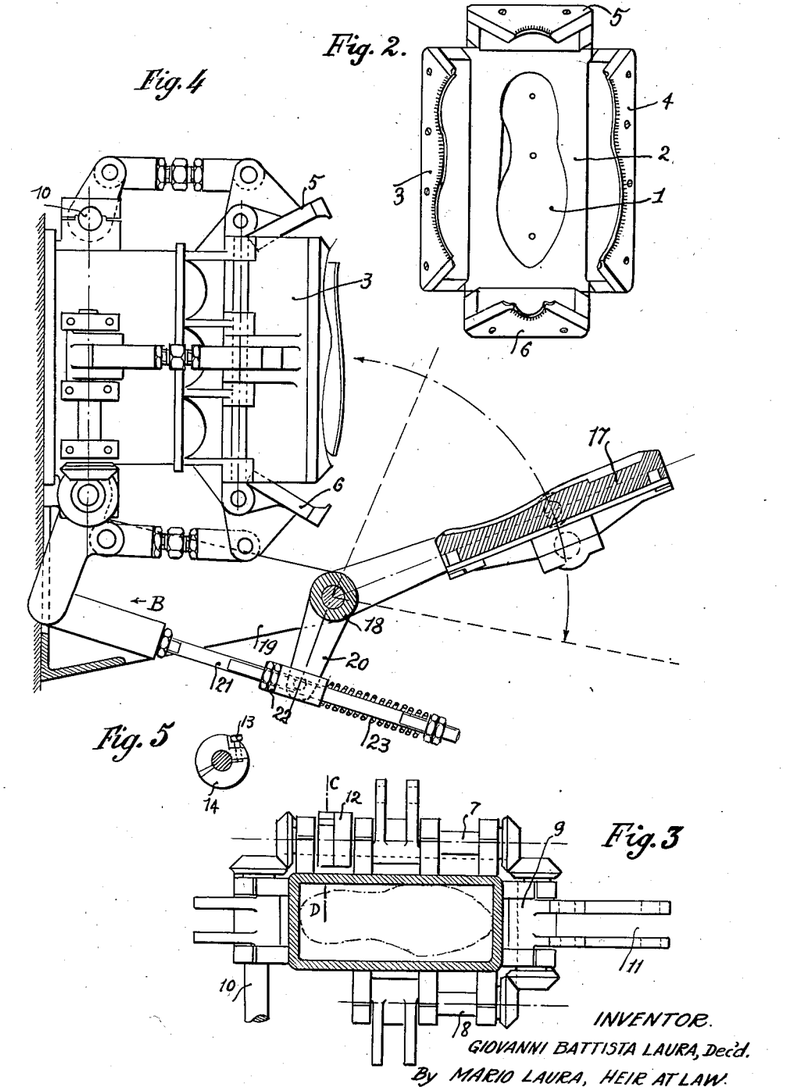
Figure 2 shows in plan the last fixed on the platform, on four sides of which pivot four segments by means of which there may be exerted a pressure on each side of the last.
Figure 3 also shows a plan view of the method of coupling the said four segments which is produced by means of four shafts coupled together by pairs of bevel toothed wheels.
Figure 4 is a side elevation showing the elbows of the four shafts carrying the connecting rods actuating the segments.
Figure 5 shows in detail the transverse section of the joint permitting the forward rotation of the said shafts carrying the connecting rods.

On the drawings (Figures 1 and 2) 1 is the last mounted on a suitable frame and fixed on a rectangular platform 2, on which pivot the four segments 3, 4, 5 and 6, carrying at their upper part four jaws the interior shape of which coincides exactly with the shape of the last. These four segments with their respective jaws can rotate approximately through an angle of 90° above their axes or spindles 7, 8, 9 and 10, these latter being connected together by means of pairs of toothed bevel wheels (Figure 3). The shaft 9 in addition to the crank for closing of the segment 6, carries a longer control crank 11 for the simultaneous closing or opening of the four segments.

The bottom segment 5 which is intended for the heel is controlled in one direction only by the general operating mechanism.

The joint 12, the construction of which is shown in section in Figure 5, permits of rotating beforehand the shaft 10 when the other segments are open, and of closing the segment 5 of the heel. Nevertheless, in this last part of the closing travel, the actuating mechanism is again connected to the other segments by the fact that the screw 13 (Figure 5) exerts a pressure at 14, which is connected with the pinion of the shaft 10.

The last 1 is provided with a groove 15 (Figure 6) containing a lining of elastic material and resisting heat, and at its upper part carries a plate 16 provided all round with an upturned edge four millimeters wide so as to form a shallow box having the shape of a sole. At the upper part of the segments there rests a mould 17 rotating about the pivot 18 which is held by the support 19 (Figure 4).

This mould 17 has in its recess the space for the sole and serves to contain the raw rubber (not yet vulcanized).

The movement of the mould or cover 17 is combined with that of the segments 3, 4, 5, 6 through an arm 20 and a connecting rod 21 attached in its turn to a crank 11 (Figure 4, where the mould as well as the segments are shown open).

When the cover 17 is raised, the arm 20 exerts a pressure on the two bearings 22 by lowering the crank 11, and the segments open. When the cover 17 is lowered towards the last, the arm 20 acts on the pressure spring 23 very firmly and the segments are closed.

The object of the spring is to permit the closing of the segments 3, 4, 5, 6, before the cover 17 bears on these segments. When the segments are closed, the cover 17 is 30° away from the plane of the segments; continuing its travel, the spring 23 is compressed and in this manner the pressure of the segments is produced by the tension of the spring independent of the force lowering the cover.

Figure 6:
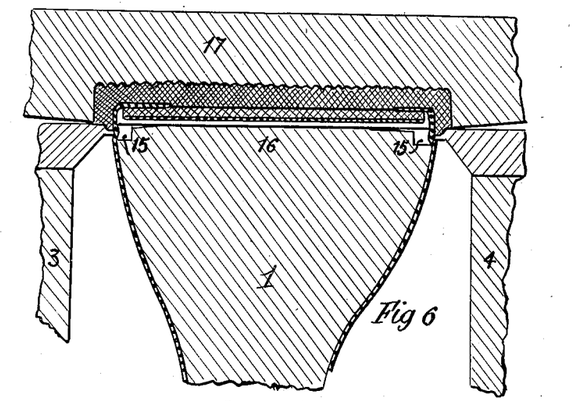
Figure 6 is a vertical cross-section of the last with the plate in box form arranged above, which plate is intended to contain the waist and the mould of the sole.

In Figure 6, which shows clearly the last 1 with segments closed and the mould 17 in the closed position, it will be seen that the box plate 16 contains the boot waist; the rubber sole in the mould 17 and the fabric of the upper is mounted on the last. The segments bear on the fabric opposite the elastic lining 15 so that the closing of the cavity of the mould 17 is perfect without exerting an excessive pressure on the fabric.

The rubber contained in the mould 17 pressed strongly against the last 1 would tend to escape downward because it is made fluid by the heat provided by the last as also by the cover 17. In addition to the direct pressure of the segments 3, 4, 5, 6 on the lining contained in the groove 15 which pressure is provided and regulated by the spring 23, there is another factor which contributes to increasing the tight closing.

The cover or mould 17 exerts a pressure on the rubber and consequently on the box plate 16, this latter having the outer portion of its under face resting on the lining of the groove 15; at the moment of compression, the edges of the plate 16 also compress the elastic lining which consequently will tend to expand towards the outside, and will thus compress still more the fabric of the upper against the segments 3, 4, 5, 6.

This device of an elastic lining which is pressed by the segments 3, 4, 5, 6 and which in its turn is compressed against the said segments with the same pressure exerted by the cover on the plate 16, constitutes the most important characteristic of the machine and is the means ensuring in a perfect and very simple manner the closure of the segments 3, 4, 5, 6.

Figures 7, 20, 21:
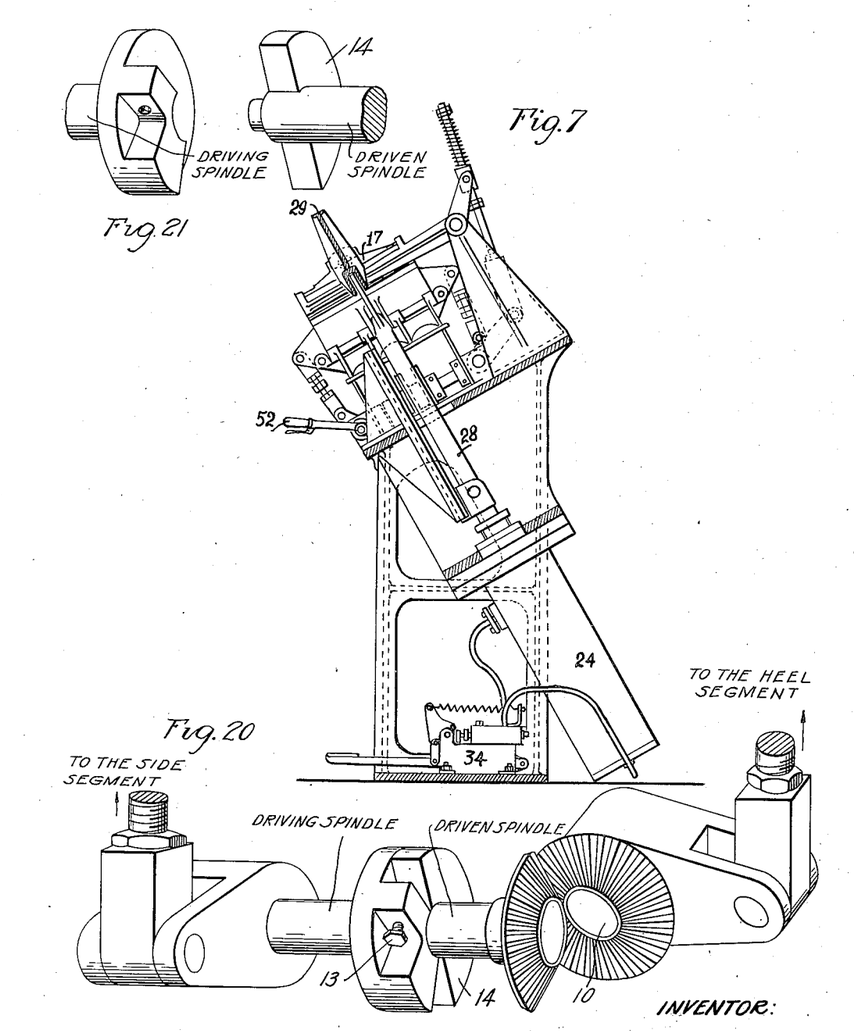
Figure 7 is a general view of the machine in side elevation the mounting mechanisms being omitted for the sake of clearness.
Figures 20 and 21 are detail views of the mechanism for producing the delayed closing of one of the segments with respect to the others.
Figure 8:
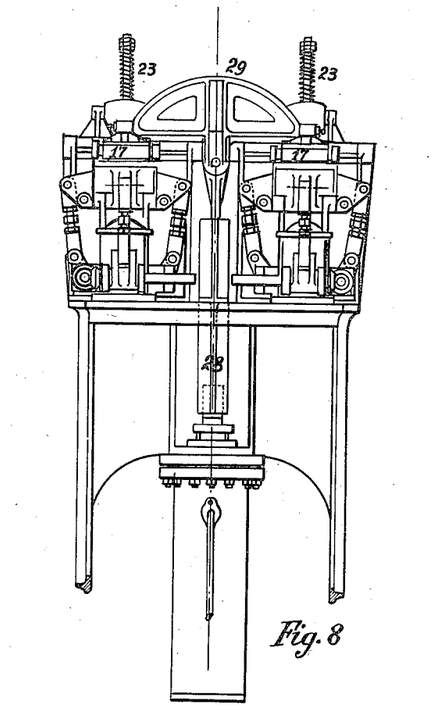
Figure 8 is a front view of the machine, the said mounting mechanisms having been also omitted for the sake of clearness.
Figure 9:
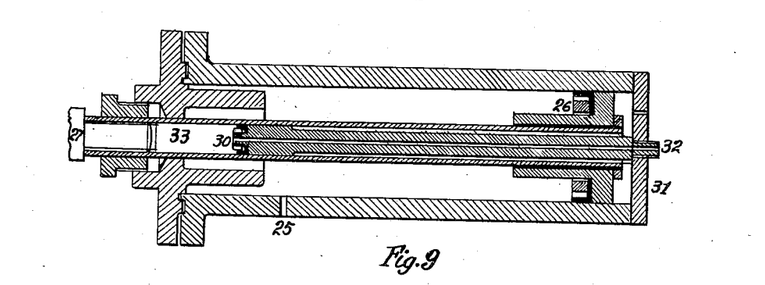
Figure 9 shows in longitudinal section the construction of the double acting hydraulic piston which is used to obtain the necessary pressure against the last.

The movements of the covers of the segments and of all the members of the machine are controlled by a hydraulic piston 24 (Figures 7 and 8) shown in section on Figure 9. This piston is double acting.

On introducing water under pressure through the opening 25 (Figure 9), the water acts on the piston 26 and lowers the rod 27, this rod 27 being attached by means of a connecting rod 28 and a cross piece 29 (Figures 7 and 8) to the two covers 17, so that by lowering the piston 25 the covers 17 are lowered and the segments 3, 4, 5, 6 close against the last.

The rod 27 is hollow, and in its turn serves as a cylinder to the small piston 30 which is fixed to the bottom 31. The piston 30 is bored over its whole length, and the hole 32 connects the cavity 33 with a hydraulic accumulator so that this cavity 33 is constantly full of water at a certain pressure.

If the large cylinder is emptied, the pressure of the chamber 33 drives the rod 27 upwards, causing the opening of the covers 17 and of the segments 3, 4, 5, 6; if, on the contrary, water under pressure is introduced into the large cylinder, the force exerted is greater than that produced by the small cylinder, and the piston 26 falls, effecting the closing of the segments and of the covers. The movements of the piston are controlled by a pedal distributing valve 34.

This distributing valve has no particular characteristic; on pressing down the pedal, there is obtained the movement upward of the rod 27, for the large cylinder is emptied; on pressing it down a second time there is obtained the movement in the opposite direction for water under pressure is introduced into the large cylinder.

Figure 10:
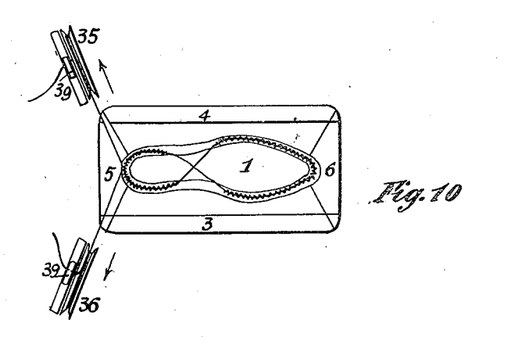
Figure 10 shows a plan of the last with an upper mounted on it and the segments closed.

In Figure 10, it will be seen that the upper is mounted on the last 1 with the segments 3, 4, 5, 6 in the closed position.

The upper has a cord sewn onto its lower edges, which crosses at the centre so as to form an 8, and the extremities of which come out at the side of the heel.

Figure 11:
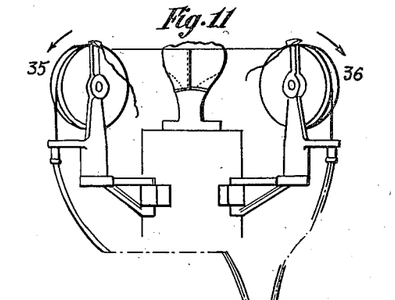
Figures 11, 12, 13 and 14 are details showing the constructions of the mechanisms used for the mounting.
Figure 13:
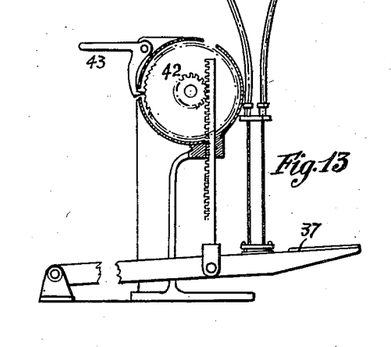

On pulling the ends of the cord in the direction of the two arrows, the edges of the upper are drawn towards the center of the last. The pulling of this cord is effected by means of two pulleys 35, 36 provided at the sides of the last 1, and the rotation of which is produced by the intermediation of a pedal 37 connected to the pulleys by means of two flexible Bowden wires wound and fixed on the circumference of the pulleys (Figures 11, 13).

Figure 12:
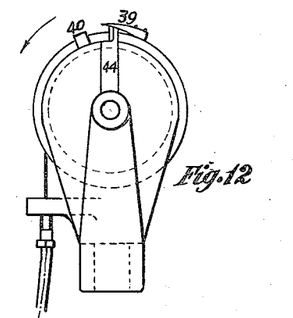
Figure 14:
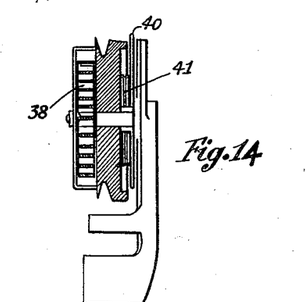

The movement of rotation of the pulley, the construction of which is shown in Figure 12, in front view, and in Figure 14 in vertical section, in the direction of the arrows is obstructed by a powerful spiral spring 38 (Figure 14) tending to keep the pulley in the position of Figure 12. The same is the case for the other pulley.

The pulleys carry at their upper part each a small wedge 39, into which is inserted the cord from the upper. In pressing down the pedal 37, the pulley rotates, and the cord is fixed to the wedge 39 by a boss 40 held back by the spring 41 (Figure 14) and which also acts in a direction contrary to the arrows.

This boss piece bends the extremity of the cord against the side of the wedge 39 and prevents it from slipping during the strain of the lifting. On continuing the pressure on the pedal, the pulleys rotate in the direction of the arrow and the upper is mounted on the last. The mechanism contained in the casing 42 (Figure 13) serves to prevent the return of the pedal upwards and the release of the wires by the pawl 43 locking the toothed wheel and consequently the pedal. It is evident that by raising the pawl 43, the springs 38 of the two pulleys effect their instantaneous rotation in a direction contrary to that of the arrows, the cords loosen, the pedal rises, and the wedges 39 return into the position shown in Figure 12. In this case, the boss piece 40 stops in the position of Figure 12 and the cord in striking against the pin 44 jumps out of the wedge 39, thus remaining automatically disengaged.

Thus, in order to connect the cords with the traction pulleys, it is sufficient to introduce said cords between the point of the wedge 39 and the boss piece 40, and to slightly press down the pedal, so that the boss piece 40 comes alongside the wedge 39. To disengage these cords, it is sufficient to raise the pawl 43 and by the instantaneous rotation of the pulleys 35, 36 in the direction contrary to that of the arrows, the cords will strike against the pin 44 which lifts them from the throat of the wedge 39.

Figure 15:
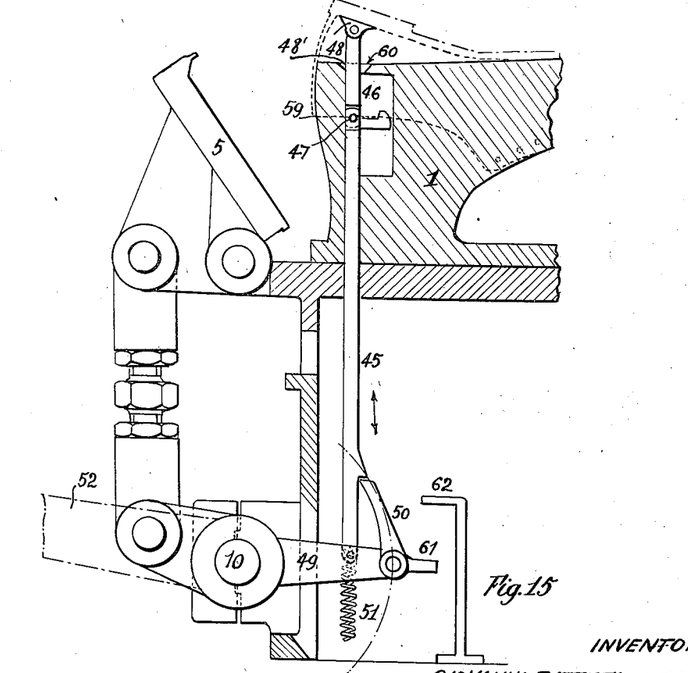
Figures 15 and 16 show the mechanisms intended to automatically remove the shoe from the last.
Figure 16:
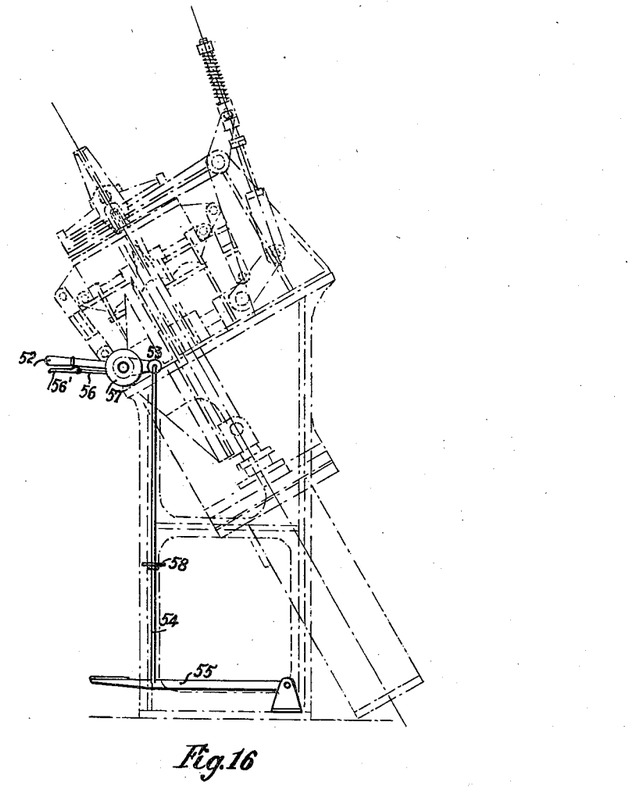
Figure 16A:
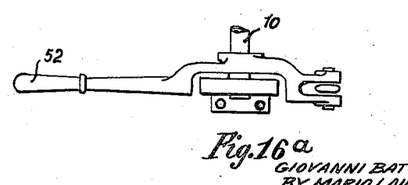
Figure 16a is a constructional detail of the control crank lever.

The two movements of fixing the cords before the mounting and their disengagement after the mounting, are instantaneous without there being any necessity of knots, screw nuts, etc. The mechanism shown on Figures 15 and 16 is intended to effect the automatic removal of the shoes from the last. The last 1 (Figure 15) is bored at its lower part and a rod 45 can slide therein from the top downwards, and vice versa. This rod 45 carries at its upper part an L-shaped piece 46 hinged at 47, and a sliding block 48 bearing against the lower surface of the heel. The movement is obtained by the intermediation of the arm 49 rotating with the pivot 10, this latter closing the segment 5.

When the arm 49 is raised, the pawl 50 lifts the rod 45; when it falls, the spring 51 brings the rod downward until the sliding block 48 lodges in the cavity 48' provided at the top of the last one.

The operation is as follows:

When the shoe is completed, the covers 17 are raised by means of the pedal hydraulic slide valve 34; the segments 3, 4, 5, 6 then open automatically for they are connected to the cover 17, while the segment 5 remains closed in view of the fact as has been already stated, that it is independent of the other three owing to the hinge 12 (Figure 3). The shoe is now completed, nevertheless it cannot be taken off the last, for the cords coming out of the heel are still fixed to the pulleys 35, 36 (Figure 11) and the segment 5 still bears against the upper.

At this moment, the hand lever 52 (Figure 16) comes into operation, this being keyed on the pivot 10. This lever carries an arm 53 connected to a pedal 55 by means of the connecting rod 54. This lever 52 also carries a ratchet device shown at the lower part and composed of a rod 56, this latter penetrating at the end of its travel in the recess shown on the fixed sector 57.

In the position of Figure 16, that is to say, when the lever 52 is at the top and the rod 56 in the recess of the sector 57, the segment is closed. To lower it, it is necessary to exert a pressure on the lower handle 56'; the rod 56 comes out of its recess, and can then be lowered, effecting the opening of the segment 5. On the lowering of the lever 52, the connecting rod 54 is lifted, and after several millimeters of movement upwards will cause the discs 58 to strike against the pawls 43 (Figure 13) suitably provided in the base alongside the connecting rod 54.

As has been seen, by raising these pawls, the mounting mechanism returns to its original position, and the cords remain disengaged. At this moment, the shoe is still on the last, but it is no longer retained by the cords, for these have been disengaged, nor by the segment 5 which has come away several millimeters from the last. On continuing to lower the lever 52, the automatic remover (Figure 15) comes into operation, and by the rotation of the arm 49 lifts the rod 45 and through the sliding piece 48 the shoe also.

When the back edge 59 of the shoe (shown dotted on Figure 15) rises above the upper plane of the last, the L piece 46 strikes against the tooth 60 so that the part 46 is forced to rotate about the pivot 47. On the rotation of the part 46, the sliding block 48 moves forward, pushing the shoe out of the last.

The return of the mechanism to the initial position takes place when the arm 61 of the pawl 50 strikes against the stop 62. The pawl 50 moves towards the right, and the rod 45, by means of the spring 51, comes down suddenly to its initial position. The function of the pedal 55 (Figure 16) is to permit the closing of the lower segment, leaving the two hands free, for at the commencement of the mounting, after the upper has been placed on the last, it is necessary to fix it at the back part, before making the mounting, and since this fixing takes place on closing the segment 5, it is easier to effect the closing by the foot by lowering the pedal 55 than by raising the lever 52 by hand.

This fixing at the back of the upper therefore takes place by pressing down the pedal 55, and, when the rod 56 penetrates into the recess of the sector 57, it is possible to carry out the mounting by means of the cords. The number of the pedals for each machine is five. One of these pedals controls the hydraulic distributing valve 34, two control the closing of the back segments 5, and the other two serve to draw the cords of the uppers.

The operation of the machine is very simple. The lasts, the segments 3, 4, 5, 6, and the covers 17, are heated electrically or by any suitable system, by which there is attained the temperature necessary for vulcanizing the rubber. The upper is applied in the last, it is fixed at its back part by lowering the pedals 55 which raise the segments 5, the cords are seized, the uppers are mounted, and after having introduced the raw rubber into the cover 17, the piston 26 is operated by means of the hydraulic distributing valve 34.

The segments 3, 4, 5, 6 bear against the fabric of the upper, the covers 17 bear on these segments, and the heated rubber under pressure is rapidly vulcanized. The rapidity of work of the machine is such that it greatly exceeds the speed of any other known machine of the kind.

The mounting of the two uppers on the lasts, the introduction of the rubber into the covers 17, takes place in 60 seconds, and the operator as soon as he has completed the mounting on one machine, passes to the next machine. Supposing that the rubber can vulcanize in three minutes, the operator should have four machines at his disposal: as soon as he has completed the mounting of the first he passes to the second, then to the third, and to the fourth; when the mounting of the fourth is completed, the first is ready for the removal of the shoe, for three minutes have elapsed from the time when the covers have been closed and placed under pressure; he then returns to the first machine, he removes the shoe therefrom, and fits another pair therein. He passes successively to the second machine, taking from it the pair which is completed and fitting on another pair, and so on.

In following out this cycle, the operator produces a pair of shoes per minute, that is to say, 480 pairs in eight hours. Calculating that the worker, starting from the uppers and the raw rubber, produces in 60 seconds a shoe completely finished, with the machine according to the invention there is obtained a saving in comparison with any other existing machine of at least 70% in the cost of manufacture.

In addition to the particulars relating to the machine, the shoe produced by the latter has particular characteristics by which it is distinguished from all others. As will be seen from Figure 17, the sole E has a maximum section at F—G which greatly diminishes at I—H, again increasing at L—M to become of a few tenths of a millimeter at N—O.

Figure 17:
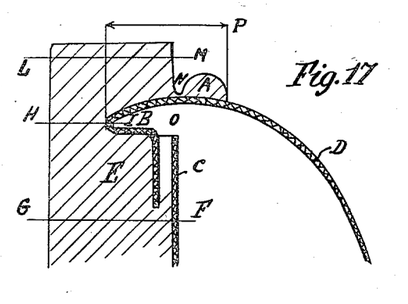
Figure 17 is a detail in longitudinal section of the point of a shoe showing the position of the upper with respect to the sole and the different thicknesses of this latter.

After the line N—O, the sole has the shape of a round head A running all round the edge of the sole. On this figure there is also clearly shown the position of the fabric of the upper with respect to the sole and that of the inner sole C. This original conformation of the sole has been designed particularly with the object of preventing the fabric D becoming detached from the sole as takes place generally after a more or less long period of use in the case of ordinary shoes with soles sewn or stuck by hand.

Figure 18:
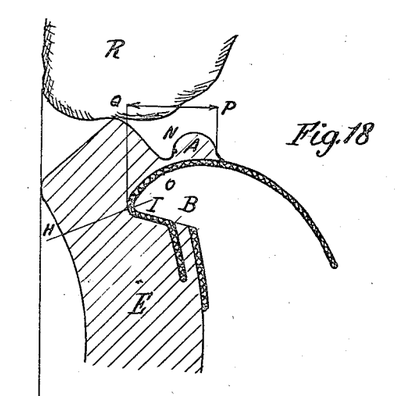
Figures 18 and 19 show the detachment effects of the sole of ordinary shoes produced by the violent blow of the shoe against an obstacle.

In Figure 18 is shown the most frequent case producing these detachments; for example, the violent blow of the shoe against an obstacle R causing the tip of the sole to be bent sharply downwards.

In ordinary shoes, this blow is transmitted directly on to the joint and tends to detach the sole; here, on the contrary, the zone P—Q being the most exposed to the effect of this blow, does not experience the consequences of this exceptional bending. The interior groove B and the exterior groove between the sole E and the round head A, greatly enlarge, for the summits of these two angles being on the lines N—O, I—H correspond to the points where the sole has a minimum section. The enlargements of the two grooves have for effect that the part P—Q is not subjected to the effects of the blow, this blow being entirely taken up by the mass of the sole.

Figure 19:
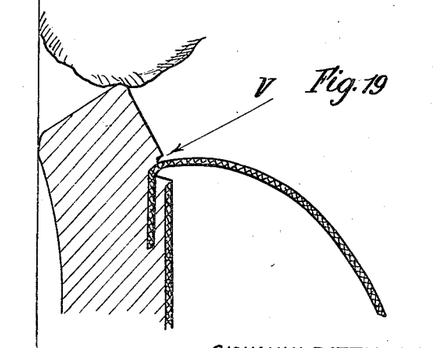

In the case shown in Figure 19 of an ordinary shoe subjected to the same strain, it is evident that the sole in bending downwards transmits the whole strain produced by the blow to the point indicated by the arrow V, for the fabric is retained in its normal position and cannot follow the sole in its new position.

What is claimed and desired to secure by Letters Patent of the United States is:—

1. A machine for the manufacture of rubber soled shoes, comprising a support member carrying a last thereon, a member for receiving an inner sole adapted to lie upon said last, means for fitting an upper to the last, four moulding segments swingable toward or away from the last about relatively fixed axes, means for swinging said segments toward closed position about said last, and means for both swinging the segments to open position away from the last and causing said segments to exert a uniform pressure upon said last, including a controlling lever adapted to move said segments, and a spring cushioning the movement of said lever with respect to said segments.

2. A machine for the manufacture of rubber soled shoes in which a lasting cord is sewn to the lower edge of the upper in figure 8 formation, comprising a last, means for tightening said cord to secure said upper to said last, four segments comprising toe, heel and two side elements co-operating with said last, means for closing said segments upon said last, and means for removing said segments from said last.

3. A machine for the manufacture of rubber soled shoes in which a lasting cord is sewn to the lower edge of the upper in figure 8 formation, comprising a last, means for tightening said cord to secure said upper to said last, four molding segments cooperating with said last, means for closing said segments upon said last, and means for removing said segments from said last.

4. A machine for the manufacture of rubber soled shoes in which a lasting cord is sewn to the lower edge of the upper in figure 8 formation, comprising a last, drawing means for tightening said cord to secure said upper to said last, automatic means for engaging and disengaging said cord with said drawing means, four segments comprising toe, heel and two side elements co-operating with said last, means for closing said segments upon said last, and means for removing said segments from said last.

5. A machine for the manufacture of rubber soled shoes comprising a last, means for fitting uppers to said last, a plate on said last having upturned flanges to form a tray to receive an inner sole, four segments comprising toe, heel and two side elements co-operating with said last, means for closing said segments upon said last, and means for removing said segments from said last.

6. A machine for the manufacture of rubber soled shoes comprising a last supported upon the machine in inverted position, means for fitting uppers to said last, a plurality of moulding segments swingable toward the last into closed position about the same, and also swingable into open position away from said last about individual horizontal axes, and means ensuring a tight joint between said last and said segments during vulcanization, including a recess forming a shoulder in the upper peripheral edge of the last and resilient means located upon said shoulder in said recess, there being means for swinging said segments.

7. A machine for the manufacture of rubber soled shoes, comprising a last supported upon the machine in inverted position, means for fitting uppers to said last, a plurality of moulding segments swingable upon individual axes toward or away from the last, means for swinging said segments, and means ensuring a tight joint between said last and said segments during vulcanization, including a recess forming a shoulder in the upper peripheral edge of the last and resilient means disposed upon said shoulder in said recess.

8. A machine according to claim 7 wherein the means for ensuring the tight joint between the last and the segments also includes a plate member adapted to lie upon the last in order to receive an inner sole thereon and having the periphery thereof projecting outwardly over said recess and co-operating with the shoulder temporarily to retain the resilient means in said recess.

9. A machine according to claim 7 wherein the means for ensuring the tight joint between the segments and the last also includes a member adapted to lie upon the last and receive an inner sole thereon and having the periphery thereof projecting outwardly over the recess and co-operating with the shoulder temporarily to retain the resilient means in said recess, and means for effecting delayed swinging of one of the segments toward the last into closed position.

10. A machine for the manufacture of rubber soled shoes comprising the combination, with a last and a plurality of moulding segments co-operating with said last, means for closing said segments upon said last, means for removing said segments from said last, and means for facilitating the removal of said shoe from said last, comprising a movable member passing up through the last and capable of being raised in order to directly disengage a portion of said shoe from said last from within the shoe.

11. A machine for the manufacture of rubber soled shoes in which a lasting cord is sewn to the lower edge of the upper in figure 8 formation, comprising a last, drawing means for tightening said cord to secure said upper to said last, automatic means for engaging and disengaging said cord to said drawing means, a plate on said last having upturned flange to form a tray to receive an inner sole, four segments comprising toe, heel and two side elements co-operating with said last, means for closing said segments upon said last, means for effecting the delayed closing of one segment relatively to the other segments, a rubber ring seated in said last and co-operating with said segments to ensure a tight joint during vulcanization, means for applying a vulcanizing pressure, means for removing said segments from said last, and means for facilitating the removal of said shoe from said last.

12. A machine for the manufacture of rubber soled shoes, in which a lasting cord is sewn on the lower edge of each upper in figure 8 formation, a last, means for tightening the cord to secure an upper to the last, drawing mechanisms for tightening said cord, a set of four segments comprising toe, heel and two side elements co-operating with the last, means for closing said segments upon said last, means for effecting the delayed closing of one segment relatively to the others of each set of segments, means to ensure a tight joint between said last and said segments during a vulcanization process, a rubber ring seated in said last and co-operating with said segments to ensure a tight joint during vulcanization, means for applying vulcanizing pressure, means for removing said segments from said last, and means for facilitating the removal of said shoe from said last.

13. A machine for the manufacture of rubber soled shoes, comprising a support surmounted by a last mounted thereon, a plurality of molding segments hinged to said support so as to be convergently swingable thereon toward said last about horizontal axes, means for closing said molding segments by swinging the same toward the last for the purpose of forming the edge of the sole, a molding plate member adapted to lie upon said last and receive the sole, and means connecting said molding plate member with the molding segments so that a partial movement of said molding plate member toward a shoe upon the machine will cause the molding segments to close, while further movement and application of pressure on the part of the molding plate will cause said molding segments to be pressed toward said last so as to ensure a uniform pressure of said molding segments against the last during vulcanization.

14. A machine for the manufacture of rubber soled shoes, comprising a stationary support surmounted by an inverted last mounted thereon, four molding segments hinged to said support so as to be convergently swingable thereon from four different directions toward said last about horizontal axes, means for closing said molding segments by simultaneously swinging the same toward the last for the purpose of forming the edge of the sole, a molding plate member adapted to lie upon said last and receive the sole, and means mechanically connecting said molding plate member with the molding segments so that a partial movement of said molding plate member toward a shoe upon the machine will cause the molding segments to close, while further movements and application of pressure on the part of the molding plate will cause said molding segments to be pressed toward said last so as to ensure a uniform pressure of said molding segments against the last during vulcanization.

MARIO LAURA,
*Heir at Law of the Estate of Giovanni Battista Laura, Deceased.*